United States Patent
Panda et al.

(10) Patent No.: US 12,106,050 B2
(45) Date of Patent: Oct. 1, 2024

(54) DEBIASING PRE-TRAINED SENTENCE ENCODERS WITH PROBABILISTIC DROPOUTS

(71) Applicant: Oracle International Corporation, Redwood City, CA (US)

(72) Inventors: Swetasudha Panda, Burlington, MA (US); Ariel Kobren, Cambridge, MA (US); Michael Louis Wick, Lexington, MA (US); Stephen Green, Burlington, MA (US)

(73) Assignee: Oracle International Corporation, Redwood City, CA (US)

( * ) Notice: Subject to any disclaimer, the term of this patent is extended or adjusted under 35 U.S.C. 154(b) by 426 days.

(21) Appl. No.: 17/589,662

(22) Filed: Jan. 31, 2022

(65) Prior Publication Data
US 2022/0245339 A1 Aug. 4, 2022

Related U.S. Application Data

(60) Provisional application No. 63/144,430, filed on Feb. 1, 2021.

(51) Int. Cl.
*G06F 40/279* (2020.01)
*G06N 20/00* (2019.01)

(52) U.S. Cl.
CPC .......... *G06F 40/279* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,467,339 B1* | 11/2019 | Shen | G06F 40/247 |
| 2018/0121788 A1 | 5/2018 | Hashimoto et al. | |
| 2018/0225281 A1 | 8/2018 | Song et al. | |
| 2018/0341637 A1* | 11/2018 | Gaur | G06F 40/211 |
| 2019/0065460 A1 | 2/2019 | Xin et al. | |
| 2019/0171874 A1* | 6/2019 | Shen | G06F 40/30 |
| 2021/0374582 A1* | 12/2021 | Tristan | G06N 20/10 |
| 2022/0058340 A1* | 2/2022 | Aggarwal | G06F 40/30 |

(Continued)

OTHER PUBLICATIONS

Steed R, Panda S, Kobren A, Wick M. Upstream mitigation is not all you need: Testing the bias transfer hypothesis in pre-trained language models. InProceedings of the 60th Annual Meeting of the Association for Computational Linguistics (vol. 1: Long Papers) May 2022 (pp. 3524-3542). (Year: 2022).*

(Continued)

*Primary Examiner* — Jonathan C Kim
(74) *Attorney, Agent, or Firm* — S. Scott Foster; Kowert, Hood, Munyon, Rankin & Goetzel, P.C.

(57) ABSTRACT

Debiasing pre-trained sentence encoders with probabilistic dropouts may be performed by various systems, services, or applications. A sentence may be received, where the words of the sentence may be provided as tokens to an encoder of a machine learning model. A token-wise correlation using semantic orientation may be determined to determine a bias score for the tokens in the input sentence. A probability of dropout that for tokens in the input sentence may be determined from the bias scores. The machine learning model may be trained or tuned based on the probabilities of dropout for the tokens in the input sentence.

20 Claims, 8 Drawing Sheets

(56) References Cited

U.S. PATENT DOCUMENTS

2022/0147713 A1* 5/2022 Garimella .............. G06F 40/56
2022/0245339 A1* 8/2022 Panda .................. G06F 40/284

OTHER PUBLICATIONS

Kaneko M, Bollegala D. Gender-preserving debiasing for pre-trained word embeddings. arXiv preprint arXiv:1906.00742. Jun. 3, 2019. (Year: 2019).*

Kurita K, Vyas N, Pareek A, Black AW, Tsvetkov Y. Measuring bias in contextualized word representations. arXiv preprint arXiv:1906.07337. Jun. 18, 2019. (Year: 2019).*

Lauscher A, Lueken T, Glavaš G. Sustainable modular debiasing of language models. arXiv preprint arXiv:2109.03646. Sep. 8, 2021. (Year: 2021).*

Liang PP, Li IM, Zheng E, Lim YC, Salakhutdinov R, Morency LP. Towards debiasing sentence representations. arXiv preprint arXiv:2007.08100. Jul. 16, 2020. (Year: 2020).*

Bolukbasi T, Chang KW, Zou JY, Saligrama V, Kalai AT. Man is to computer programmer as woman is to homemaker? debiasing word embeddings. Advances in neural information processing systems. 2016;29. (Year: 2016).*

Panda S, Kobren A, Wick M, Shen Q. Don't just clean it, proxy clean it: Mitigating bias by proxy in pre-trained models. InFindings of the Association for Computational Linguistics: EMNLP 2022 Dec. 2022 (pp. 5073-5085). (Year: 2022).*

Qian Y, Muaz U, Zhang B, Hyun JW. Reducing gender bias in word-level language models with a gender-equalizing loss function. arXiv preprint arXiv:1905.12801. May 30, 2019. (Year: 2019).*

Webster K, Wang X, Tenney I, Beutel A, Pitler E, Pavlick E, Chen J, Chi E, Petrov S. Measuring and reducing gendered correlations in pre-trained models. arXiv preprint arXiv:2010.06032. Oct. 12, 2020. (Year: 2020).*

Manzini T, Lim YC, Tsvetkov Y, Black AW. Black is to criminal as caucasian is to police: Detecting and removing multiclass bias in word embeddings. arXiv preprint arXiv:1904.04047. Apr. 3, 2019. (Year: 2019).*

Dzmitry Bahdanau, Kyunghyun Cho, and Yoshua Bengio. 2014. "Neural machine translation by jointly learning to align and translate". Published as a conference paper at ICLR 2015, arXiv preprint arXiv:1409.0473, pp. 1-15.

Christine Basta, Marta R Costa-Jussà, and Noe Casas. 2019. "Evaluating the underlying gender bias in contextualized word embeddings". arXiv preprint arXiv:1904.08783, pp. 1-7.

Rishabh Bhardwaj, Navonil Majumder, and Soujanya Poria. 2020. "Investigating Gender Bias in BERT". arXiv preprint arXiv:2009.05021, pp. 1-8.

Tolga Bolukbasi, Kai-Wei Chang, James Zou, Venkatesh Saligrama, and Adam Kalai. Advances in Neural Information Processing Systems 29 (NIPS 2016), "Man is to Computer Programmer as Woman is to Homemaker? Debiasing Word Embeddings". arXiv preprint arXiv:1607.06520, pp. 1-25.

Aylin Caliskan, Joanna J Bryson, and Arvind Narayanan. 2017. "Semantics derived automatically from language corpora contain human-like biases," Research, Science, 356(6334): pp. 183-186.

Pengyu Cheng, Weituo Hao, Siyang Yuan, Shijing Si, and Lawrence Carin. Published as a conference paper at ICLR 2021, "FairFil: Contrastive Neural Debiasing Method for Pretrained Text Encoders", arXiv preprint arXiv:2103.06413, pp. 1-12.

Robert Dale. "Law and word order: Nlp in legal tech". copyright Cambridge University Press 2018Natural Language Engineering, 25(1): pp. 211-217.

Jacob Devlin, Ming-Wei Chang, Kenton Lee, and Kristina Toutanova. 2019. BERT: Pre-training of deep bidirectional transformers for language under-standing. (In Proceedings of the 2019 Conference of the North American Chapter of the Association for Computational Linguistics: Human Language Technologies, vol. 1 (Long and Short Papers), pp. 4171-4186), Minneapolis, Minnesota. Association for Computational Linguistics, downloaded from arXiv preprint arXiv:1810.04805, pp. 1-16.

Lucas Dixon, John Li, Jeffrey Sorensen, Nithum Thain, and Lucy Vasserman. 2018. Measuring and mitigating unintended bias in text classification. In Proceedings of the 2018 AAAI/ACM Conference on AI, Ethics, and Society, pp. 67-73.

Sahaj Garg, Vincent Perot, Nicole Limtiaco, Ankur Taly, Ed H Chi, and Alex Beutel. 2019. "Counterfactual Fairness in Text Classification through Robustness". In Proceedings of the 2019 AAAI/ACM Conference on AI, Ethics, and Society, pp. 219-226.

Anthony G Greenwald, T Andrew Poehlman, Eric Luis Uhlmann, and Mahzarin R Banaji. 2009. "Understanding and using the Implicit Association Test: III. Meta-analysis of predictive validity". Journal of personality and social psychology, 97(1), pp. 1-25.

Moritz Hardt, Eric Price, and Nathan Srebro. "Equality of Opportunity in Supervised Learning", Part of Advances in Neural Information Processing Systems 29 (NIPS 2016), arXiv preprint arXiv:1610.02413, pp. 1-22.

Sepp Hochreiter and Jürgen Schmidhuber. 1997. "Long short-term memory". Neural Comput., 9(8):1735-1780 (pp. 1-32).

Svetlana Kiritchenko and Saif M Mohammad. 2018."Examining Gender and Race Bias in Two Hundred Sentiment Analysis Systems". arXiv preprint arXiv:1805.04508, pp. 1-13.

Paul Pu Liang, Irene Mengze Li, Emily Zheng, Yao Chong Lim, Ruslan Salakhutdinov, and Louis-Philippe Morency. 2020. "Towards Debiasing Sentence Representations". arXiv preprint arXiv:2007.08100, pp. 1-14.

Sean MacAvaney, Andrew Yates, Arman Cohan, and Nazli Goharian. 2019. "CEDR: Contextualized Embeddings for Document Ranking," In Proceedings of the 42nd International ACM SIGIR Conference on Research and Development in Information Retrieval, 2019, pp. 1101-1104, arXiv:1904.07094v2 (pp. 1-5).

Thomas Manzini, Yao Chong Lim, Yulia Tsvetkov, and Alan W Black. 2019. "Black is to Criminal as Caucasian is to Police: Detecting and Removing Multiclass Bias in Word Embeddings". arXiv preprint arXiv:1904.04047, pp. 1-8.

Rebecca Marvin and Tal Linzen. 2018. "Targeted Syntactic Evaluation of Language Models". Proceedings of the 2018 Conference on Empirical Methods in Natural Language Processing, arXiv preprint arXiv:1808.09031, pp. 1192-1202.

Chandler May, Alex Wang, Shikha Bordia, Samuel R Bowman, and Rachel Rudinger. 2019, "On Measuring Social Biases in Sentence Encoders". Proceedings of the 2019 Conference of the North American Chapter of the Association for Computational Linguistics: Human Language Technologies, vol. 1 (Long and Short Papers), pp. 622-628.

Moin Nadeem, Anna Bethke, and Siva Reddy. 2020. "Stereoset: Measuring stereotypical bias in pretrained language models". arXiv preprint arXiv:2004.09456, pp. 1-15.

Nikita Nangia, Clara Vania, Rasika Bhalerao, and Samuel R Bowman. 2020. "CrowS-Pairs: A Challenge Dataset for Measuring Social Biases in Masked Language Models". arXiv preprint arXiv:2010.00133, pp. 1-15.

Adam Paszke, et al., "PyTorch: An Imperative Style, High-Performance Deep Learning Library," Part of Advances in Neural Information Processing Systems 32 (NeurIPS 2019), arXiv:1912.01703v1, 2019, pp. 1-12.

Jeffrey Pennington, Richard Socher, and Christopher D Manning. 2014. "GloVe: Global Vectors for Word Representation,". In Proceedings of the 2014 conference on empirical methods in natural language processing (EMNLP), pp. 1532-1543.

Matthew Peters, Mark Neumann, Mohit Iyyer, Matt Gardner, Christopher Clark, Kenton Lee, and Luke Zettlemoyer. "Deep Contextualized Word Representations,". In Proceedings of the 2018 Conference of the North American Chapter of the Association for Computational Linguistics: Human Language Technologies, vol. 1 (Long Papers), pp. 2227-2237, New Orleans, Louisiana. Association for Computational Linguistics, 2018.

Alec Radford, Karthik Narasimhan, Tim Salimans, and Ilya Sutskever. "Improving Language Understanding by Generative Pre-Training," Published 2018, Computer Science, pp. 1-12.

(56) References Cited

OTHER PUBLICATIONS

Richard Socher, Alex Perelygin, Jean Wu, Jason Chuang, Christopher D Manning, Andrew Y Ng, and Christopher Potts. 2013. "Recursive Deep Models for Semantic Compositionality Over a Sentiment Treebank,". In Proceedings of the 2013 Conference on Empirical Methods in Natural Language Processing, pp. 1631-1642.
Nitish Srivastava, Geoffrey Hinton, Alex Krizhevsky, Ilya Sutskever, and Ruslan Salakhutdinov. 2014. "Dropout: A Simple Way to Prevent Neural Networks from Overfitting,". The journal of machine learning research, 15(1):pp. 1929-1958.
Fei Sun, Jun Liu, Jian Wu, Changhua Pei, Xiao Lin, Wenwu Ou, and Peng Jiang. 2019. "BERT4Rec: Sequential Recommendation with Bidirectional Encoder Representations from Transformer," In Proceedings of the 28th ACM International Conference on Information and Knowledge Management, pp. 1441-1450.
Tony Sun, Andrew Gaut, Shirlyn Tang, Yuxin Huang, Mai ElSherief, Jieyu Zhao, Diba Mirza, Elizabeth Belding, Kai-Wei Chang, and William Yang Wang. 2019. "Mitigating Gender Bias in Natural Language Processing: Literature Review," arXiv preprint arXiv:1906.08976, pp. 1-11.
Yi Chern Tan and L Elisa Celis. 2019. "Assessing Social and Intersectional Biases in Contextualized Word Representations," Part of Advances in Neural Information Processing Systems 32 (NeurIPS 2019). arXiv preprint arXiv:1911.01485, pp. 1-17.

\* cited by examiner

```
<person subject> feels <emotion word>.
The situation makes <person object> feel <emotion word>
I made <person object> feel <emotion word>.
<person subject> made me feel <emotion word>.
<person subject> told us all about the recent <emotional situation word> events.
<person subject> landed in a/an <emotional situation word> situation.
The conversation with <person object> was <emotional situation word>.
<person subject> was <emotion word> after reading the news.
<person subject> usually feels <emotion word> while attending social events.
<person subject> feels <emotion word> after coming back from vacation.
The series of events put <person subject> in a/an <emotional situation word> state.
<person subject> was in a/an <emotional situation word> state.
```

Table 1: Sentence templates for generating sentiment classification dataset.

*FIG. 2*

| Male names | Female names |
|---|---|
| John, William, James, Charles, George, Frank, Joseph, Thomas, Henry, Robert, Edward, Harry, Walter, Arthur, Fred, Albert, Samuel, David, Louis, Joe | Emily, Isabella, Emma, Ava, Jennifer, Sophia, Olivia, Heather, Hannah, Elizabeth, Jessica, Samantha, Ashley, Alyssa, Emily, Stephanie, Natalie, Sarah, Amanda, Grace |

Table 2: List of names in each bias attribute group.

FIG. 3A

| Positive emotion word | Negative emotion word |
|---|---|
| good, glad, relieved, excited, funny, amazing, wonderful, great, smart, playful, rich, whimsical, witty, gleeful, elated, elevated, entranced, euphoric, exhilarated, giddy, intoxicated, enthusiastic, thrilled, delighted, glad, gratified, happy, joyful, pleased, satisfied, tickled | bad, angry, furious, irritated, enraged, annoyed, sad, depressed, devastated, miserable, disappointed, terrified, discouraged, scared, anxious, fearful, horrible, cold, desolate, lonely, miserable, morbid, morose |

Table 3: List of emotion words.

FIG. 3B

| Positive emotional situation word | Negative emotional situation word |
|---|---|
| happy, ecstatic, hilarious, amazing, wonderful, great, amusing, diverting, entertaining, jocular, playful, jolly, jovial, laughing, mad, merry, enraptured, rapt, rapturous, rhapsodic, enchanted, exultant, glorying, jubilant, rejoicing, triumphant, enthusiastic, blissful, happy, joyful, joyous, pleased, satisfied, tickled | irritating, vexing, outrageous, annoying, displeasing, depressing, serious, grim, heartbreaking, gloomy, horrible, threatening, terrifying, shocking, dreadful, depressing, encouraging, demotivating, alarming, dire, dreadful, forbidding, formidable, frightening, ghastly, horrendous, horrible, horrifying, intimidating, scary, spine-chilling, terrible, terrifying, daunting, demoralizing, disconcerting, discouraging, dismaying, disquieting, distressing, disturbing, perturbing, startling, threatening, troubling, trying, unnerving, bleak, dark, depressive, dire, disconsolate, dismal, dreary, forlorn, funereal, gloomy |

Table 4: List of emotional situation words.

FIG. 3C

DEBIASING PRE-TRAINED SENTENCE ENCODERS WITH PROBABILISTIC DROPOUTS

RELATED APPLICATIONS

This application claims benefit of priority to U.S. Provisional Application Ser. No. 63/144,430, entitled "Debiasing Pre-trained Sentence Encoders with Probabilistic Dropouts," filed Feb. 1, 2021, and which is incorporated herein by reference in its entirety.

BACKGROUND

Pre-trained natural language processing models are being increasingly deployed for decision making in various application domains. It is inevitable for these models to encode and exhibit undesirable biases and stereotypes in the learned representations as well as model predictions. While there exists substantial research on addressing such biases at the word embeddings level, attempts to debias sentence embeddings lack extensive exploration.

SUMMARY

Techniques for debiasing pre-trained sentence encoders with probabilistic dropouts may be performed by various systems, services, or applications. Bias information may be identified as associated with tokens in an input sentence to an encoder of a machine learning model. A token-wise correlation using semantic orientation may be used to determine a bias score for the tokens in the input sentence. A probability of dropout that replaces a token with a dropout token may be determined. The machine learning model may then be trained or tuned based on the dropout tokens.

BRIEF DESCRIPTION OF THE DRAWINGS

FIG. 2 illustrates an example set of sentence templates, according to some embodiments.

FIGS. 3A-3C illustrate example lists of example names and emotion words, according to some embodiments.

Figure 1:
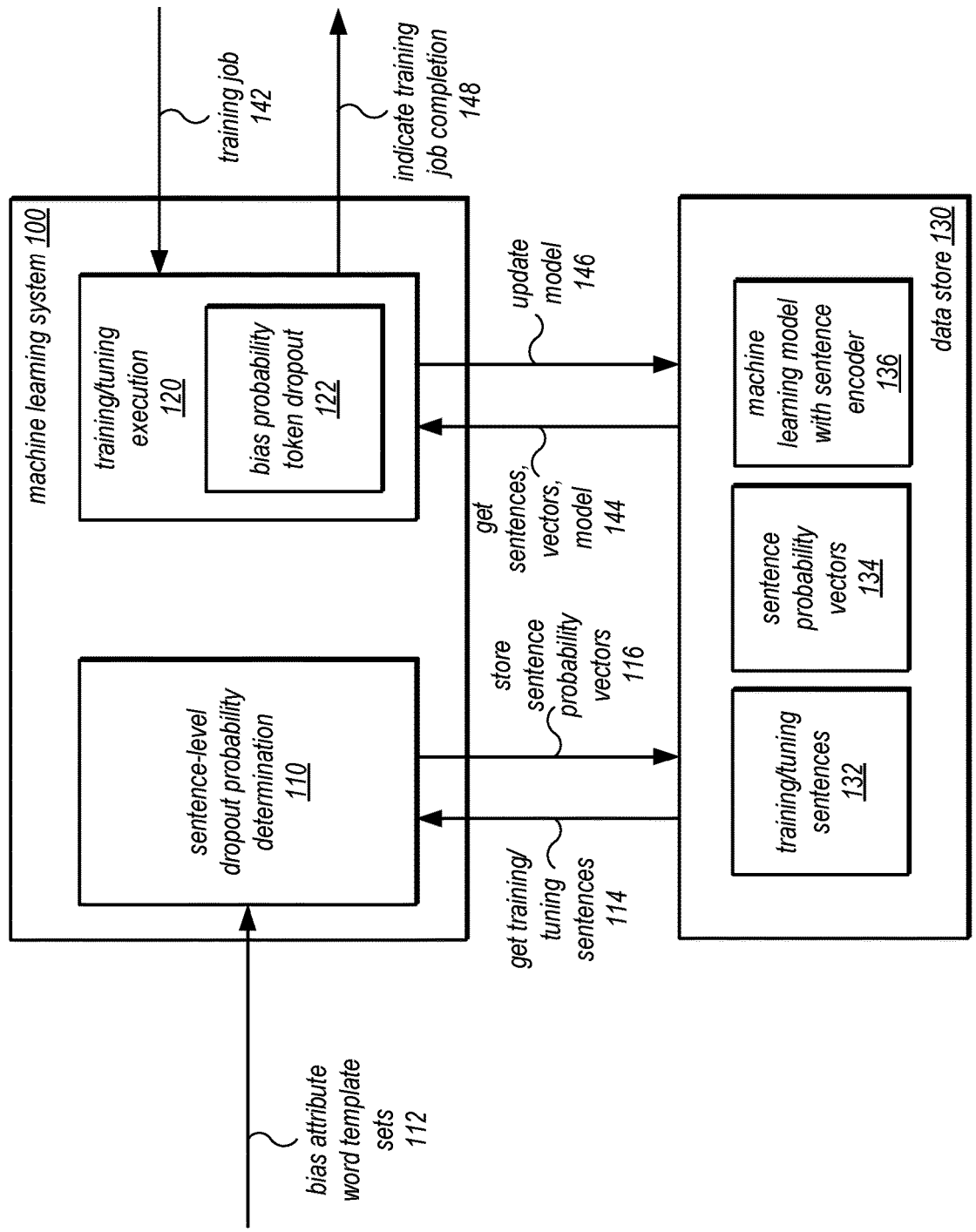
FIG. 1 is a logical block diagram illustrating a machine learning system, that implements debiasing pre-trained sentence encoders with probabilistic dropouts, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (e.g., meaning having the potential to) rather than the mandatory sense (e.g. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for debiasing pre-trained sentence encoders with probabilistic dropouts are described herein. In various embodiments, techniques for a probabilistic dropout approach during training or fine-tuning of pre-trained sentence encoders may be implemented. Selectively attenuating contribution from tokens may be performed which are highly correlated with predefined biased attribute words may be used to debias or alleviate undesirable biases and stereotypes in the learned representations as well as model predictions. Various example scenarios and evaluations on real-world datasets demonstrate the effectiveness such techniques, as discussed below.

Machine learning models may utilize neural networks to perform natural language processing (NLP) tasks. These "neural language models" are increasingly deployed in various critical application domains, such as healthcare, legal systems, and banking. For example, in various embodiments, pre-trained sentence encoders such as Bidirectional Encoder Representations from Transformers (BERT) and Generative Pre-trained Transformer 2 (GPT-2) use deep learning techniques to perform NLP downstream tasks. Pre-trained sentence encoders, like BERT and GPT-2, are trained on massive scales of text corpora to learn sentence-level text representations to achieve superior performance on a variety of NLP downstream tasks.

In some scenarios, it may be demonstrated that the encodings or other representations generated or used by pre-trained sentence encoders at both a word and sentence level can be susceptible to exhibiting undesirable biases and stereotypes. These biases can arise from stereotypical patterns in the existing training data as well as from creation and amplification of these patterns during the training process and loss minimization. As a result, such bias effects are eventually reflected in the predictions performed as part of the downstream NLP tasks.

Pre-trained sentence embeddings for downstream tasks achieve superior performance when compared to word representations. While there is previous work on addressing bias at the word-level of embeddings, sentence-level solutions are limited. Sentence-level debiasing is challenging due to the following reasons. First, it is enormously computationally expensive to retrain massive scale sentence encoder models. Second, sentence representations learn and encode highly complex associations and contextual interdependencies. This makes it difficult to scale word-level debiasing approaches to operate at the sentence-level. While some existing techniques have begun to address these issues, by transforming the embedding space post-hoc and using contextual information to capture interactions with bias attribute words, such as gender or ethnicity. such approaches need access to enormous text corpora to construct appropriate sentence templates which can lead to insufficient generalization. Moreover, such approaches assume a linearity of bias which may not be true in many situations.

There is a third challenge, unaddressed by existing techniques, which arises out of the language model's typical use case as part of a downstream NLP task. In particular, debiasing the sentence embeddings directly is not sufficient because new biases could later be re-introduced in the fine-tuning process of the downstream task. But, de-biasing the fine-tuning process is fraught with difficulty. The reason is that a typical strategy for debiasing often involves a projection onto a less biased subspace. However, these high-capacity networks can simply learn to invert the debiasing projection.

In various embodiments, a probabilistic or stochastic dropout approach during training or fine-tuning of pre-trained sentence encoders may be implemented. This technique may drop words out in proportion to specific characteristics of bias, such as a bias score, during training or fine-tuning of a sentence encoder. In this way, systems, applications, or other services implementing the techniques described in various embodiments below can selectively attenuate contribution from words (e.g., ignore or otherwise reduce the influence of words) which are highly correlated with predefined biased attribute words. Various example scenarios and evaluations on real-world datasets demonstrate the effectiveness such techniques, as discussed below.

In various embodiments, a token-wise bias score may be implemented with semantic orientation. First, the amount of bias information associated with each token (e.g., word) in the sentence input to the encoder may be identified. This bias information can be predefined according to a particular notion of bias or by defining specific bias attributes, in various embodiments. For example, gender could be assigned as the bias attribute, using two or more gender categories. Although in the working example, "male" and "female" are used as gender categories, such techniques would be applicable to other gender categories or identities. Thus the foregoing example is not intended to be limiting to the existence of and usefulness of techniques for other genders as a bias attribute.

The bias attribute may be specified as a template, in some embodiments. In various embodiments, template words may be provided for each category of gender. For the "male" category, example template words may include ["man", "boy", "he", "himself", "father", "son", "guy", "male", "John"]. For the "female" category, example template words may include ["woman", "girl", "she", "herself", "mother", "daughter", "gal", "female", "Mary"].

Given a bias attribute, the token-wise correlation using a semantic orientation technique may be calculated. For example, in some embodiments, the cosine similarity of the pre-trained word embeddings of each token with the word embeddings of the template words belonging to each category of the biased attribute may be determined. For a token i, the average cosine similarity may be computed with the "male" set of template words and that with the "female" set of template words. Then, the absolute value of the difference between the two averages may be calculated as the bias score of that token, where bias score $\phi_i = |\{\Sigma_{j \in male} \cos(w_i, w_j)/|male|\}| - |\{\Sigma_{j \in female} \cos(w_i, w_k)/|female|\}|$ and $w_i$ denoting the word embedding for the token i.

Note that the bias score $\phi_i \in [0,2]$ (arising from the absolute value of the difference between two cosine similarities) and a higher score implies that the token is relatively more associated with one of the bias categories (e.g., "male" or "female" template words).

This technique to compute bias scores may be performed for each token in the input sentence such that a higher score reflects a stronger association with a particular category. This results in a bias vector for each input tokenized sentence in the training data.

In various embodiments, dropouts of tokens may be based on the determined bias scores. For example, the bias vectors determined above may be leveraged to determine the probability of dropout for each token such that tokens with high bias scores are assigned a higher probability of dropout. For example, in various embodiments, the bias vector may be transformed for each input tokenized sentence into a vector of probabilities by performing, for example a division by 2 as $\phi_i \in [0,2]$. Unlike a stochastic regularization technique, in some embodiments, individual tokens may be dropped out during fine-tuning, by replacing those with the [MASK] token (e.g., for a BERT model).

The transformer model may then trained and/or fine-tuned on the training dataset with the bias-specific dropouts enforced, in some embodiments. In this way, the model may be encouraged to rely less on words which have stronger associations with a bias attribute and to rely more on other tokens, during training and therefore subsequent predictions. In various embodiments, adding these dropouts may also serve as an additional regularizer during training.

FIG. 1 is a logical block diagram illustrating a machine learning system, that implements debiasing pre-trained sentence encoders with probabilistic dropouts, according to some embodiments. Machine learning system 100 may be a training and/or tuning system for new or pre-trained machine learning models that utilize sentence encoders. Machine learning system 100 may be implemented on one (or more) computer systems, like computer system 1000 discussed below with regard to FIG. 7. In some embodiments, machine learning system 100 (or portions thereof) may be implemented as part of various applications that perform natural language processing. For example, a sentiment analysis system (e.g., as discussed in the examples given below) may utilize bias attribute word template sets to determine dropout probabilities for tuning a given pre-trained machine learning model with a sentence encoder for a specific use case. Such techniques could be applied on or by a service or system that tailors natural language processing applications to remove or reduce bias for words of concern, allowing a system client to submit a machine learning model and bias attribute word template sets and returning a bias reduced tuned model. As different bias attributes may be of concern in different contexts, the above techniques may be adaptable to different scenarios based on different bias attribute word template sets.

As illustrated in FIG. 1, machine learning system 100 may receive bias attribute word template sets 112, in some embodiments. While depicted as a separate input 112, such bias attribute word template sets may be specified as part of a training job 142 or other configuration information provided to machine learning system 100. In some embodiments, however, such information may be separately provided (e.g., in scenarios where other aspects of training or tuning the machine learning model may be automated for users that may not have machine learning expertise). For example, a system that removes or reduces bias for NLP applications may implement a user interface with text entry or other user interface elements that allow a user to specify the categories of a bias attribute and then complete respective bias word templates for those categories by entering the template words via the user interface element. Guided entry interfaces (e.g., graphical user interface (GUI) "wizards" or other series of interactive interface elements may prompt and obtain the bias attribute word template sets 112). Similar interfaces for configuring or specifying training job 142 may include interface elements to add the bias attribute word template sets, in some embodiments, or provide (e.g., upload) a pre-trained machine learning model with sentence encoder for which machine learning system 100 may return a tuned machine learning model using given bias attribute word template sets for deployment in another application that performs NLP processing tasks.

Machine learning system 100 may implement sentence-level dropout probability determination 110 may implement techniques similar to those discussed above (and below with regard to FIGS. 4-6, to generate sentence probability vectors 134 for a given sent of training and tuning sentences 132. For example, sentence-level dropout probability determination 110 may access data store 130 (which may be one of various kinds of data store connected to or accessible to machine learning system 100) to get training and tuning sentences. Sentence-level dropout probability determination 110 may implement a tokenizer to identify the tokens in training/tuning sentences 132. Sentence-level dropout probability determination 110 may perform token-wise comparisons with semantic orientation to determine bias scores using the given bias attribute word template sets 112. These bias scores may then be used to assign probabilities for dropout to the tokens in sentences and may be stored, as indicated at 116, as sentence probability vectors 134 in data store 130.

Machine learning system 100 may also implement training/tuning execution 120, which may implement various training and tuning techniques, that include a regularization technique or other component which may implement bias probability token dropout 122. For example, training/tuning execution 120 may obtain, from data store 130, the training/tuning sentences 132, sentence probability vectors 134, and the machine learning model with sentence encoder 136 in order to perform training or tuning. As part of the training or tuning, bias probability token dropout may selectively determine tokens in the training/tuning sentences to dropout from consideration in training iterations (e.g., epochs) using the sentence probability vectors. Dropouts may be implemented in various ways, such as by removing the dropped tokens or by replacing the dropped tokens with mask tokens. The dropped out tokens may change in the same sentence from one training/tuning iteration of training/tuning sentences 132 to the next, as the selective process may use the probability as a likelihood of dropping a particular token in an iteration, in some embodiments. When training or tuning is complete, the updated model 146 may be stored as part of data store 130.

In various embodiments, machine learning system 100 may implement an interface that accepts training job requests, like training job 142, and provides training job information, such as an indication that a training job is complete, as indicated at 148. For example, various programmatic interfaces (e.g., Application Programming Interfaces (APIs)), command line interfaces, and/or GUIs may be implemented to receive training jobs. In some embodiments, as noted above, bias attribute word templates, and/or other information to configure the performance of bias probability token dropout may be received as part of the training job request. For example, bias probability token dropout may be specified or configured along with hyperparameters for training job 142.

Although not illustrated, in some embodiments machine learning system 100 may also implement the trained/tuned machine learning model according to the above techniques in order to provide inferences on given input sentences for various NLP tasks. For instance, applications that implement sentiment analysis similar to the examples discussed below may utilized a trained/tuned machine learning model according to the above techniques to detect sentiment in text with reduced or eliminated bias introduced as a result of the machine learning model.

The specification next discusses an example implementation of the above techniques, providing performance information that may be indicative of the performance improvements systems that implement debiasing pre-trained sentence encoders with probabilistic dropouts may achieve. Then, various exemplary flowcharts illustrating methods and techniques, which may be implemented by machine learning system 100, or other systems or applications are discussed. Finally, an example computing system is discussed upon which various embodiments may be implemented is discussed.

Consider the example implementation described below in light of the techniques discussed above. For instance, experimental results on a synthetic dataset may be described. The generation of the synthetic dataset may be described with targeted amounts of the biased attribute. The downstream task may then be that of binary sentiment classification. Next, the example set up for training the transformer encoder model may be described. Results with and without the dropouts demonstrating that the dropouts approach achieves significant debiasing effect on the test data may then be described.

In the example discussed above, data generation may be synthetic. An objective may be to generate synthetic data with controlled degrees of bias (as described below) for the task of binary sentiment classification.

For example, a set of 10 sentence templates with placeholders for a) names (male/female, 20 possibilities in each group) and b) sentiment words (positive/negative, 40 possibilities in each group) may be described. FIG. 2 illustrates an example set of sentence templates. As indicated 210, the sentence templates are listed in Table 1. FIGS. 3A-3C illustrate example names and emotion words, as indicated at 310, 320, and 330 in Tables 2, 3 and 4 respectively. Permutations over the templates, names and bias attribute words may be performed to construct a dataset of size 15,182 sentences and associated sentiment labels (e.g., positive or negative sentiment).

The example scenario may be to train the sentence encoder model with a) male names and positive sentiment words and b) female names and negative sentiment words combinations. The hypothesis here is that the model will learn these specific patterns in the training data and thus incorporate the bias of associating male names with positive sentiments and the female names with negative sentiments.

A transformer encoder model may then be trained with the following self-attention architecture: number of trainable parameters: 479, 490, number of hidden dimensions: 128, number of layers: 3 and number of attention heads: 4, in this example.

In this example, two sets of test data may be constructed as the following combinations of names and sentiment words. Test 1 may be defined as a sub set of the held out test data with the same combination of names and sentiment words as in the training set. Test 2 may be defined as a subset of the test data with the opposite combination of names and sentiment words e.g., male names with negative sentiment words and female names with positive sentiment words. The set up may be 80% training, 10% validation (9105 samples for training and validation) and 10% test (3036/3041 samples for Test 1 and Test 2).

The hypothesis underlying this testing on two different test datasets may be that when trained model on is tested using Test 1, it may be expected to produce a very high accuracy. However, when the trained model is tested on Test 2, if the accuracy drops significantly, that would indicate that the model has learned the bias pattern in the training data. Furthermore, the dropouts approach can then be tested on Test 2 to determine whether the accuracy goes back to similar numbers as in case of Test 1.

Results may be reported with binary bias vectors for the sentences in the training data in this example. This binary bias vector assigns a score of 1 to any name token in the sentence and assigns a score of 0 to every other token. In other examples, a continuous bias vector with scores computed using the semantic orientation approach could be used.

The training may be performed with and without the dropouts approach and report the test accuracies on each of the test datasets above. The results may show that the dropouts approach enables the model to disregard the targeted bias patterns in the training data and thereby, the model achieves equivalent performance on each of the test datasets, (e.g., even when the test data Test 2 has the opposite combination of names and sentiment words compared to the training set). Training of the example described above may be performed on an Oracle Labs SLURM GPU cluster or other computing system, such as computer system 1000 discussed below with regard to FIG. 7. Each training session may be conducted for 100 epochs. The Adam optimizer with a learning rate of 0.001 may be used. A batch size of 1024 may be used.

The model may achieve 100% accuracy on Test 1. This confirms the hypothesis that the model learns the bias patterns in the training data (e.g., the model learns to associate male names with positive sentiment words and female names with negative sentiment words). A logistic regression weights analysis on the training data may be performed as well to confirm this observation. Next, a test on the Test 1 dataset may be performed and the accuracy on that is 0.53%. Again, this significantly decreased accuracy confirms the hypothesis that the model has encoded the particular combination of names and sentiment words on the training set and therefore, it fails to perform on the opposite combination. In fact, the decisions from the models can be reversed to obtain a high accuracy on this test set indicating that the model has learned the exact opposite combination compared to the combination of names and sentiment words in Test 1.

For the example implementations discussed above, a report on the accuracies on the two sets of the test data, with the dropouts approach enforced during the encoder model training may be given. We begin with deterministic dropout of the name tokens in the input sentence, (e.g., by replacing any name token with a 'DROPOUT' token). With this setup, the accuracy on Test 1 is 100% and that on Test 1 is 99.18%. Next, add the probabilities for the dropouts on the name tokens by omitting those tokens p % of the time where p varies as (0.0, 10, 20, 30, 40, 50, 60, 70, 80, 90, 100). The resulting accuracies on Test 1 are (1.48, 47.94, 71.98, 70.7, 72.71, 83.92, 86.68, 82.8, 91.71, 83.56, 99.18) respectively (in percentages). The above numbers reflect that as the probability of dropout of the name tokens increases, the model's capacity to ignore predefined patterns in the training data increases.

For comparison, an example was performed with equal dropouts, (e.g., replacing all tokens (not necessarily the name tokens only) with a probability p as above). The resulting accuracies on Test 2 are (1.48, 22.36, 29.43, 29.86, 32.88, 35.28, 36.53, 42.55, 30.25, 34.63, 46.86) respectively (in percentages). This demonstrates that equal dropouts approach is unable to mitigate the bias pattern in the training data, in some scenarios. As expected, equal dropout the entire time (p=100%) leads to a random predictor. Selective dropout of the name tokens (which are indicative of the bias attribute, e.g., gender in the example above), results in a significant improvement on the test accuracy on Test 2. This demonstrates that the probabilistic dropouts approach helps to improve the sentence encoder model by ensuring the sentence encoder model does not learn predefined patterns during the training process.

Figure 4:
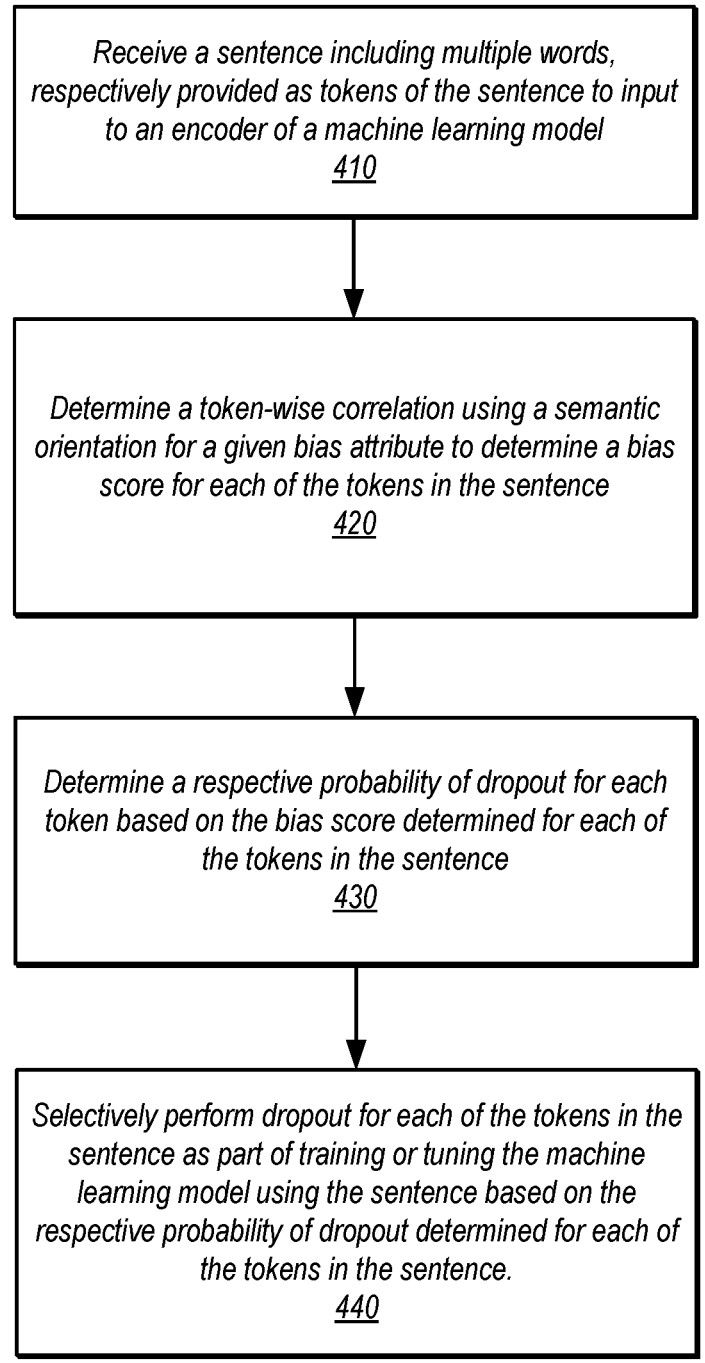
FIG. 4 is a flow diagram illustrating methods and techniques for debiasing pre-trained sentence encoders with probabilistic dropouts, according to some embodiments.

Various different systems, services, or applications may implement the techniques discussed above. For example, FIG. 7, discussed below, provides an example computing system that may implement various ones of the techniques discussed above. FIG. 4 is a flow diagram illustrating methods and techniques for debiasing pre-trained sentence encoders with probabilistic dropouts, according to some embodiments, which may be performed by different systems, services, or applications. These techniques, and those discussed below with regard to FIGS. 5 and 6, may be implemented on systems similar to those discussed above with regard to FIG. 1 as well as other machine learning systems, services, or platforms, or those that incorporate machine learning based NLP processing techniques.

As indicated at 410, a sentence including multiple words may be received. Various techniques for tokenizing an input sentence may be implemented. For example, a parser may be implemented that scans an input sentence for delimiting symbols, such as a space character, or other punctuation, and then provide the character strings between the spaces as words that are the respective tokens of the input sentence. Various other tokenizing techniques may be implemented. Thus the previous example is not intended to be limiting. In various embodiments, tokenization may be performed in order to represent tokens in a format supported by or understood by the encoder, such as formats supported by pre-trained sentence encoders such as BERT and GPT-2 as discussed above.

As indicated at 420, a token-wise correlation using a semantic orientation for a given bias attribute to determine a bias score for each token in the sentence, may be determined, as discussed above, in various embodiments. For example, as discussed in detail below, a set of words in a template belonging to one category of an attribute may be received via an interface of a machine learning system, as part of a configuration file, training task specification, or as part of a separate input (e.g., graphical, command-line, or other style of interface). Multiple templates for a bias attribute (e.g., where one template corresponds to one category) may be received and used to determine token-wise correlation. As discussed in detail below with regard to FIG. 5, techniques such as an absolute difference of the average similarities of a token with a template may be used to determine the bias score in token-wise fashion. Other techniques, however, may also be implemented.

As indicated at 430, a probability of a dropout for each token based on the bias score determined for each token may be determined, wherein the dropout replaces the token with a dropout token indicating the determined probability, as discussed above, in various embodiments. For example, as discussed in detail below with regard to FIG. 6, probabilities may be directly determined from a bias score corresponding to a token in a bias vector. However, other techniques may also be utilized to map bias scores to probabilities.

As indicated at 440, dropout for each of the tokens may be selectively performed as part of a training or tuning the machine learning model using the sentence based on the respective probability of dropout determined for each of the tokens in the sentence. For example, a regularization technique may be used to remove, mask, or otherwise drop tokens on different training passes or epochs over the sentence. Note that the sentence may be one of many different sentences, such as the example sentences given in FIG. 2. The above techniques may be performed to provide dropout probabilities for each of the tokens in each of these sentences such that a training or tuning data set of sentences may have the accompanying probabilities for performing selective dropouts across the training or tuning data set. As machine learning training and tuning techniques may iteratively train or tune over the data set, the selective dropouts may different on different iterations of the same sentence (e.g., Sentence 1 may have 2 dropouts of words 1 and 3 in one iteration and Sentence 1 may have 1 dropout of word 3 in another iteration).

Figure 5:
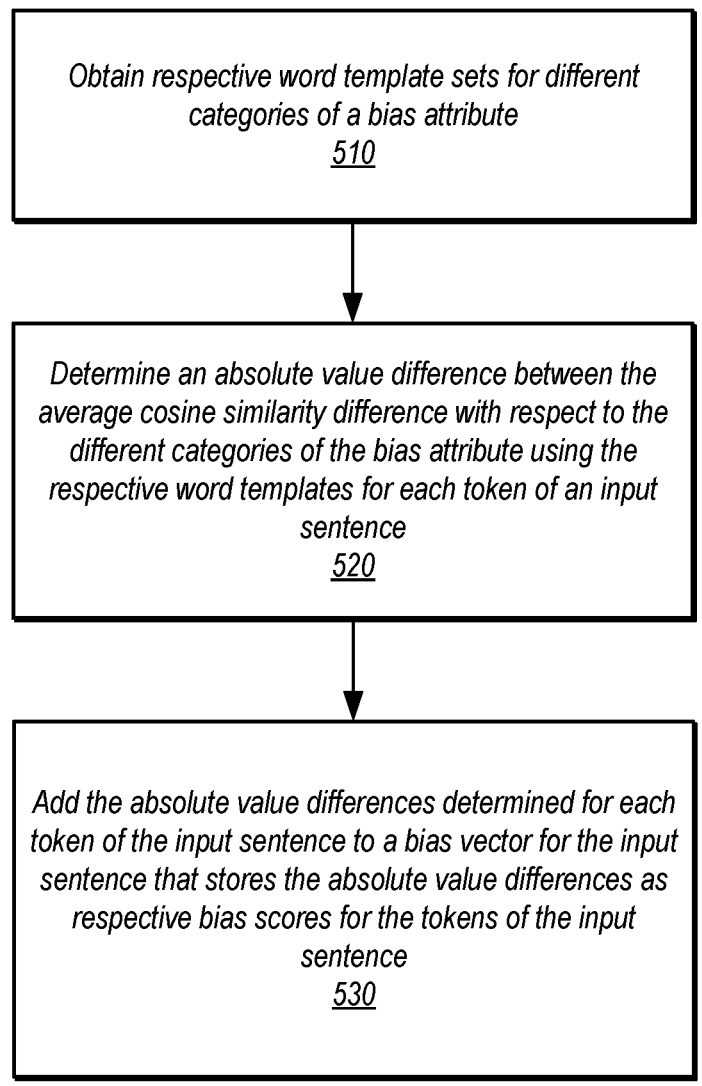
FIG. 5 is a flow diagram illustrating methods and techniques for generating a bias vector for an input sentence, according to some embodiments.

In some embodiments, bias scores may be represented as a bias vector, where each token in the sentence has a corresponding bias score in the bias vector. FIG. 5 is a flow diagram illustrating methods and techniques for generating a bias vector for an input sentence, according to some embodiments. As indicated at 510, respective word template sets may be obtained for different categories of a bias attribute. For example, as discussed above, two category example of a bias feature "gender" with "male" and "female" categories may be used, with different corresponding word template sets. As also discussed above, some bias attributes may, like gender, have more than two categories, thus the techniques described below may be performed for more than two categories in other scenarios.

As indicated at 520, an absolute value difference between the cosine similarity difference with respect to the different categories of the bias attribute using the respective word templates for each token of the input sentence may be determined, in some embodiments. Cosine similarity may be determined based on a vector form of a token of a sentence and vector forms of each word in the word template set for a category. These individual similarity values may then be averaged. The difference between the average similarity values between each category's word template set may be determined so that a token that is highly similar to one category may have a higher value.

As indicated at 530, the absolute value difference may be considered the respective bias score of a token. That bias score for that token may be added as a data point in a bias vector that is constructed for the input sentence. The techniques of elements 520 and 530 may be repeated until a bias score for each token has been generated.

Figure 6:
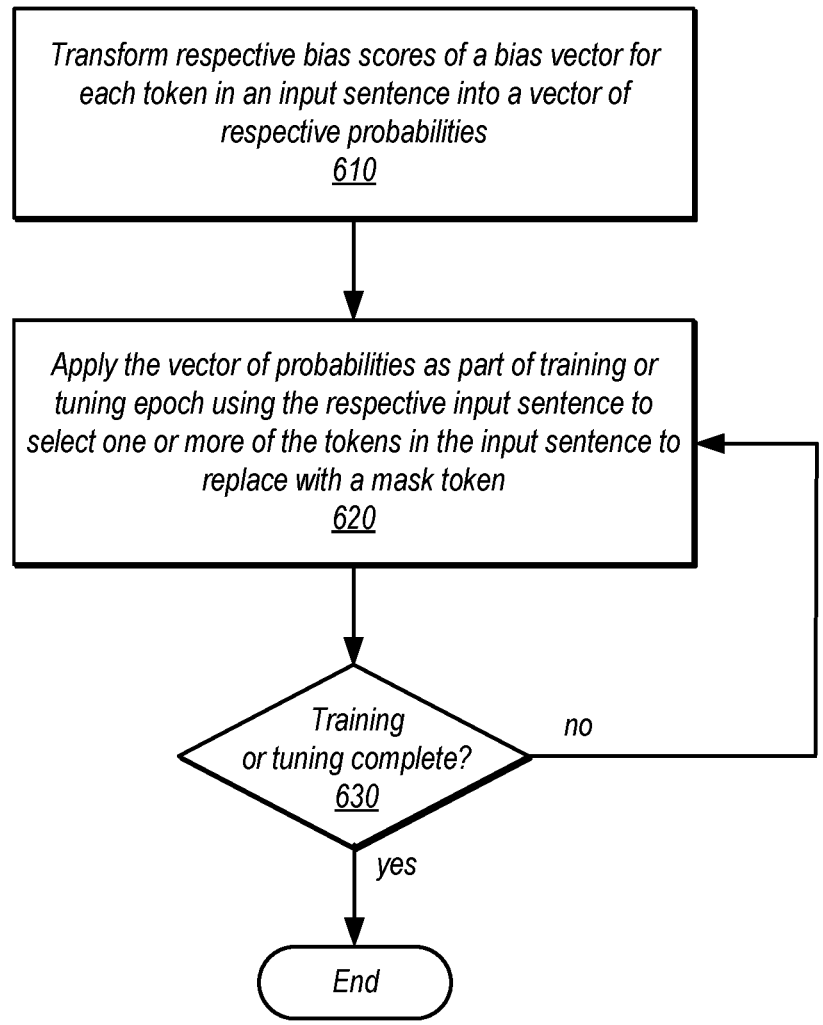
FIG. 6 is a flow diagram illustrating techniques to tune the machine learning model using the bias vector, according to some embodiments.

For embodiments that utilize a bias vector, techniques for utilizing the bias vector to perform selective dropouts to de-bias training or tuning using sentences may be performed. FIG. 6 is a flow diagram illustrating techniques to tune the machine learning model using the bias vector, according to some embodiments. As indicated at 610, respective bias scores of a bias vector may be transformed for each token in an input sentence into a vector of respective probabilities, in some embodiments. For example, as discussed above, in a scenario where two categories are implemented a division by 2 may be performed in order calculate the respective probability scores as the absolute value of the difference in two cosine similarities is in the range [0,2]. Therefore, the division by 2 transforms this difference into the [0,1] range, which can be used as the probability.

As indicated at 620, the vector of probabilities may be applied as part of training or tuning each epoch using the respective input sentence to select one or more tokens in the input sentence to replace with a mask token. For example, <DROP>, <MASK>, or various other styles of mask token may be utilized. In some epochs, no tokens of the input sentence may be dropped.

As indicated at 630, training or tuning may be iteratively performed. Therefore, different permutations of tokens in the same sentence may be dropped (or not dropped at all) in different training or tuning epochs. A stop condition, which may be specified as part of machine learning job or configuration may then determine when training or tuning completes, in various embodiments.

Figure 7:
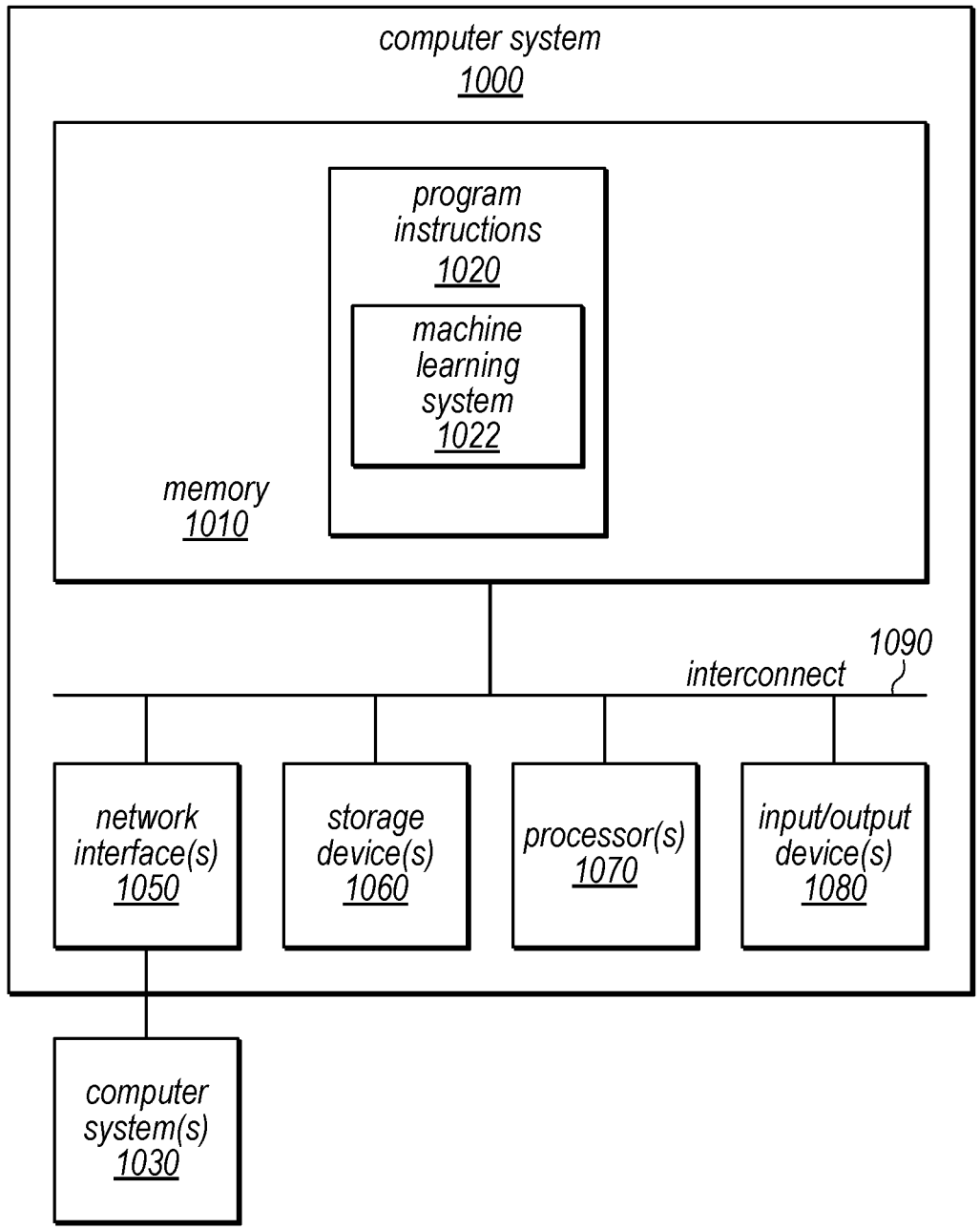
FIG. 7 illustrates an example computing system, according to some embodiments.

FIG. 7 illustrates a computing system configured to implement the methods and techniques described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing online post-processing in rankings for constrained utility maximization, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement various features described above, including a machine learning system 1022 as discussed above with regard to FIG. 1 that may perform the various training and application of re-ranking models, in some embodiments as described herein. Program instructions 1020 may be encoded in platform native binary, any interpreted language such as Java™ byte-code, or in any other language such as C/C++, Java™, etc. or in any combination thereof. System memories 1010 may also contain LRU queue(s) 1026 upon which concurrent remove and add-to-front operations may be performed, in some embodiments.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Those skilled in the art will appreciate that computer system 1000 is merely illustrative and is not intended to limit the scope of the methods for providing enhanced accountability and trust in distributed ledgers as described herein. In particular, the computer system and devices may include any combination of hardware or software that may perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:
1. A system, comprising:
 at least one processor;
 a memory, comprising program instructions that when executed by the at least one processor cause the at least one processor to implement a machine learning system, the machine learning system configured to:
  receive a sentence comprising a plurality of words, respectively to be provided as tokens of the sentence to input to an encoder of a machine learning model;

determine a token-wise correlation using a semantic orientation for a given bias attribute to determine a bias score for each of the tokens in the sentence;

determine a respective probability of dropout for each token based on the bias score determined for each of the tokens in the sentence; and selectively perform dropout for each of the tokens in the sentence as part of training or tuning the machine learning model using the sentence based on the respective probability of dropout determined for each of the tokens in the sentence.

2. The system of claim 1, wherein the bias score corresponds to a bias attribute;

wherein the machine learning system is further configured to obtain respective word template sets for two or more categories of the bias attribute; and wherein to determine the token-wise correlation using the semantic orientation for the given bias attribute to determine the bias score for each of the tokens in the sentence, the machine learning system is configured to:

determine an absolute value difference between an average cosine similarity difference for each of the tokens with respect to the two or more categories of the bias attribute using the respective word template sets for the two or more categories of the bias attribute; and add the absolute value differences determined for each of the tokens to a bias vector for the sentence that stores the absolute value differences as respective bias scores for the tokens of the input sentence.

3. The system of claim 2, wherein to obtain respective word template sets for two or more categories of the bias attribute, the machine learning system is configured to receive the respective word template sets via an interface separate from an interface for receiving a training job that causes the training or tuning of the machine learning model.

4. The system of claim 2, wherein to obtain respective word template sets for two or more categories of the bias attribute, the machine learning system is configured to receive the respective word template sets via an interface as part of receiving a training job that causes the training or tuning of the machine learning model.

5. The system of claim 2, wherein to determine the respective probability of dropout for each token based on the bias score determined for each of the tokens in the sentence, the machine learning system is configured to transform the respective bias scores of the bias vector into a vector of respective probabilities by dividing the bias scores by a number of the two or more categories; and wherein to selectively perform the dropout for each of the tokens in the sentence as part of training or tuning the machine learning model using the sentence based on the respective probability of dropout determined for each of the tokens in the sentence, the machine learning model is configured to apply the vector of probabilities to select one or more tokens in the sentence to replace with a mask token.

6. The system of claim 1, wherein the machine learning model is pre-trained such that the dropout for each of the tokens in the sentence is performed as part of tuning the pre-trained machine learning model.

7. The system of claim 1, wherein the machine learning system is further configured to:

receive, via an interface, the machine learning model from a client; and return, via the interface, the trained or tuned machine learning model to the client.

8. A method, comprising:

receiving, by a machine learning system, a sentence comprising a plurality of words, respectively provided as tokens of the sentence to input to an encoder of a machine learning model;

determining, by the machine learning system, a token-wise correlation using a semantic orientation for a given bias attribute to determine a bias score for each of the tokens in the sentence;

determining, by the machine learning system, a respective probability of dropout for each token based on the bias score determined for each of the tokens in the sentence; and selectively performing, by the machine learning system, dropout for each of the tokens in the sentence as part of training or tuning the machine learning model using the sentence based on the respective probability of dropout determined for each of the tokens in the sentence.

9. The method of claim 8, wherein the bias score corresponds to a bias attribute;

wherein the method further comprises obtaining respective word template sets for two or more categories of the bias attribute; and wherein determining the token-wise correlation using the semantic orientation for the given bias attribute to determine the bias score for each of the tokens in the sentence, comprises:

determining an absolute value difference between an average cosine similarity difference for each of the tokens with respect to the two or more categories of the bias attribute using the respective word template sets for the two or more categories of the bias attribute; and adding the absolute value differences determined for each of the tokens to a bias vector for the sentence that stores the absolute value differences as respective bias scores for the tokens of the input sentence.

10. The method of claim 9, wherein obtaining the respective word template sets for two or more categories of the bias attribute, comprises receiving the respective word template sets via an interface separate from an interface for receiving a training job that causes the training or tuning of the machine learning model.

11. The method of claim 9, wherein obtaining the respective word template sets for two or more categories of the bias attribute, comprises receiving the respective word template sets via an interface as part of receiving a training job that causes the training or tuning of the machine learning model.

12. The method of claim 9, wherein determining the respective probability of dropout for each token based on the bias score determined for each of the tokens in the sentence, comprises transforming the respective bias scores of the bias vector into a vector of respective probabilities by dividing the bias scores by a number of the two or more categories; and wherein selectively performing the dropout for each of the tokens in the sentence as part of training or tuning the machine learning model using the sentence based on the respective probability of dropout determined for each of the tokens in the sentence, comprises applying the vector of probabilities to select one or more tokens in the sentence to replace with a mask token.

13. The method of claim 8, wherein the machine learning model is pre-trained such that the dropout for each of the tokens in the sentence is performed as part of tuning the pre-trained machine learning model.

14. The method of claim 8, further comprising:
receiving, via interface of the machine learning system, the machine learning model from a client; and
returning, via the interface of the machine learning system, the trained or tuned machine learning model to the client.

15. One or more non-transitory, computer-readable storage media, storing program instructions that when executed on or across one or more computing devices, cause the one or more computing devices to implement:
receiving, by a machine learning system, a sentence comprising a plurality of words, respectively provided as tokens of the sentence to input to an encoder of a machine learning model;
determining, by the machine learning system, a token-wise correlation using a semantic orientation for a given bias attribute to determine a bias score for each of the tokens in the sentence;
determining, by the machine learning system, a respective probability of dropout for each token based on the bias score determined for each of the tokens in the sentence; and
selectively performing, by the machine learning system, dropout for each of the tokens in the sentence as part of training or tuning the machine learning model using the sentence based on the respective probability of dropout determined for each of the tokens in the sentence.

16. The one or more non-transitory, computer-readable storage media of claim 15,
wherein the bias score corresponds to a bias attribute;
wherein the method further comprises obtaining respective word template sets for two or more categories of the bias attribute; and
wherein, in determining the token-wise correlation using the semantic orientation for the given bias attribute to determine the bias score for each of the tokens in the sentence, the program instructions cause the one or more computing devices to implement:
determining an absolute value difference between an average cosine similarity difference for each of the tokens with respect to the two or more categories of the bias attribute using the respective word template sets for the two or more categories of the bias attribute; and
adding the absolute value differences determined for each of the tokens to a bias vector for the sentence that stores the absolute value differences as respective bias scores for the tokens of the input sentence.

17. The one or more non-transitory, computer-readable storage media of claim 16, wherein, in obtaining the respective word template sets for two or more categories of the bias attribute, the program instructions cause the one or more computing devices to implement receiving the respective word template sets via an interface separate from an interface for receiving a training job that causes the training or tuning of the machine learning model.

18. The one or more non-transitory, computer-readable storage media of claim 16, wherein, in obtaining the respective word template sets for two or more categories of the bias attribute, the program instructions cause the one or more computing devices to implement receiving the respective word template sets via an interface as part of receiving a training job that causes the training or tuning of the machine learning model.

19. The one or more non-transitory, computer-readable storage media of claim 16,
wherein, in determining the respective probability of dropout for each token based on the bias score determined for each of the tokens in the sentence, the program instructions cause the one or more computing devices to implement transforming the respective bias scores of the bias vector into a vector of respective probabilities by dividing the bias scores by a number of the two or more categories; and
wherein, in selectively performing the dropout for each of the tokens in the sentence as part of training or tuning the machine learning model using the sentence based on the respective probability of dropout determined for each of the tokens in the sentence, the program instructions cause the one or more computing devices to implement applying the vector of probabilities to select one or more tokens in the sentence to replace with a mask token.

20. The one or more non-transitory, computer-readable storage media of claim 15, storing further instructions that when executed on or across the one or more computing devices, cause the one or more computing devices to further implement:
receiving, via interface of the machine learning system, the machine learning model from a client; and
returning, via the interface of the machine learning system, the trained or tuned machine learning model to the client.

* * * * *